June 22, 1943.    B. GROB ET AL    2,322,684
MACHINE TOOL
Filed Aug. 21, 1935    2 Sheets-Sheet 1
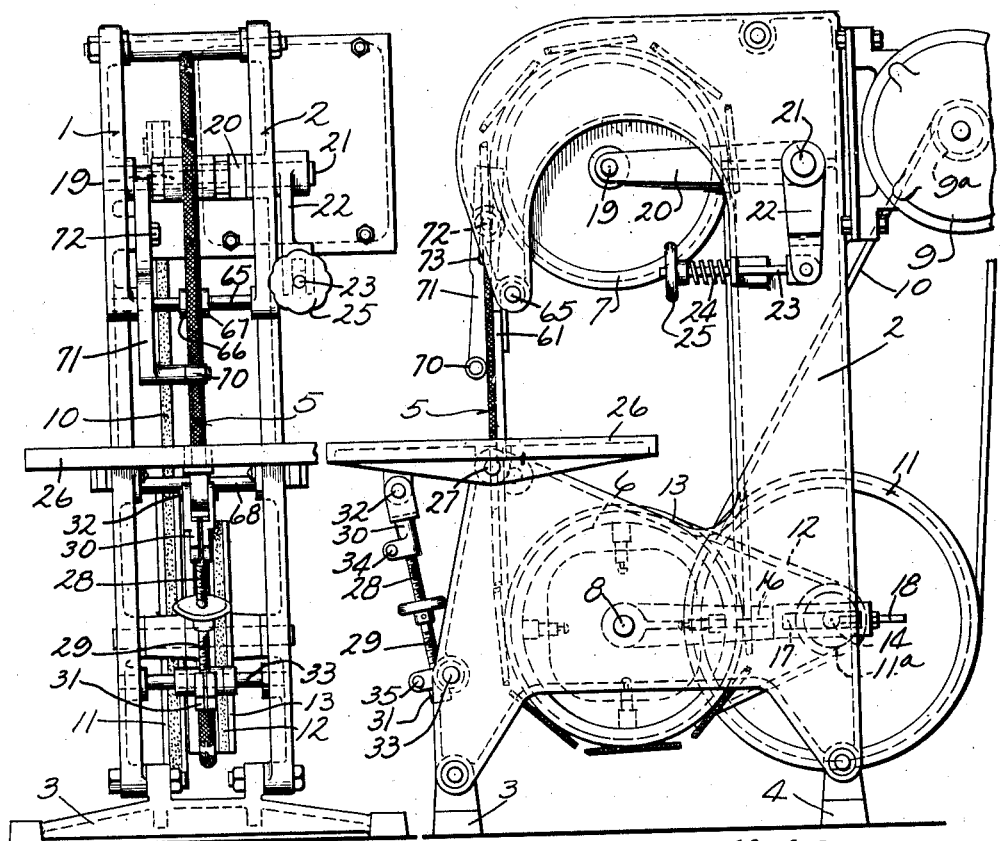
Fig. 2.    Fig. 1.
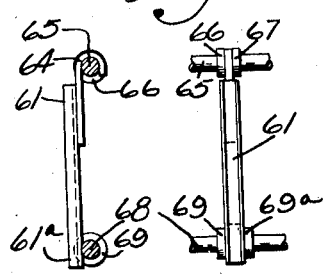
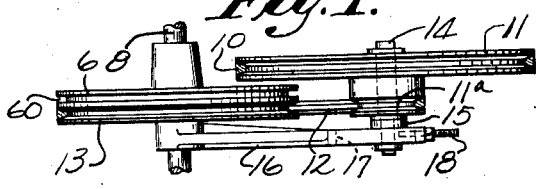
Fig. 3.
Fig. 4.  Fig. 5.
INVENTORS
Benjamin Grob
Theodor Grob
BY
Fred G. Parsons
ATTORNEY

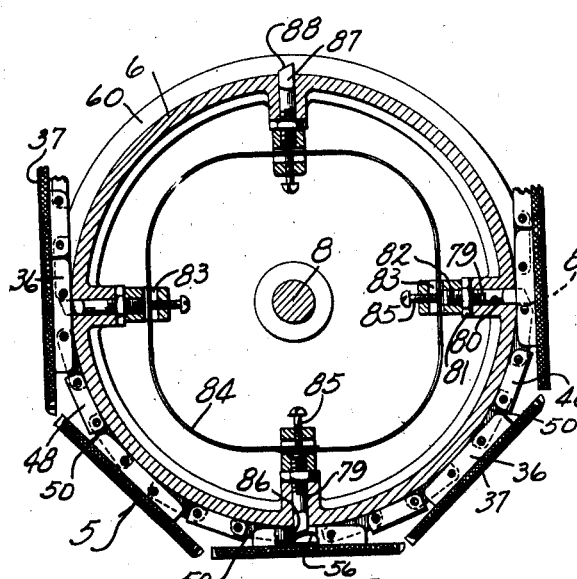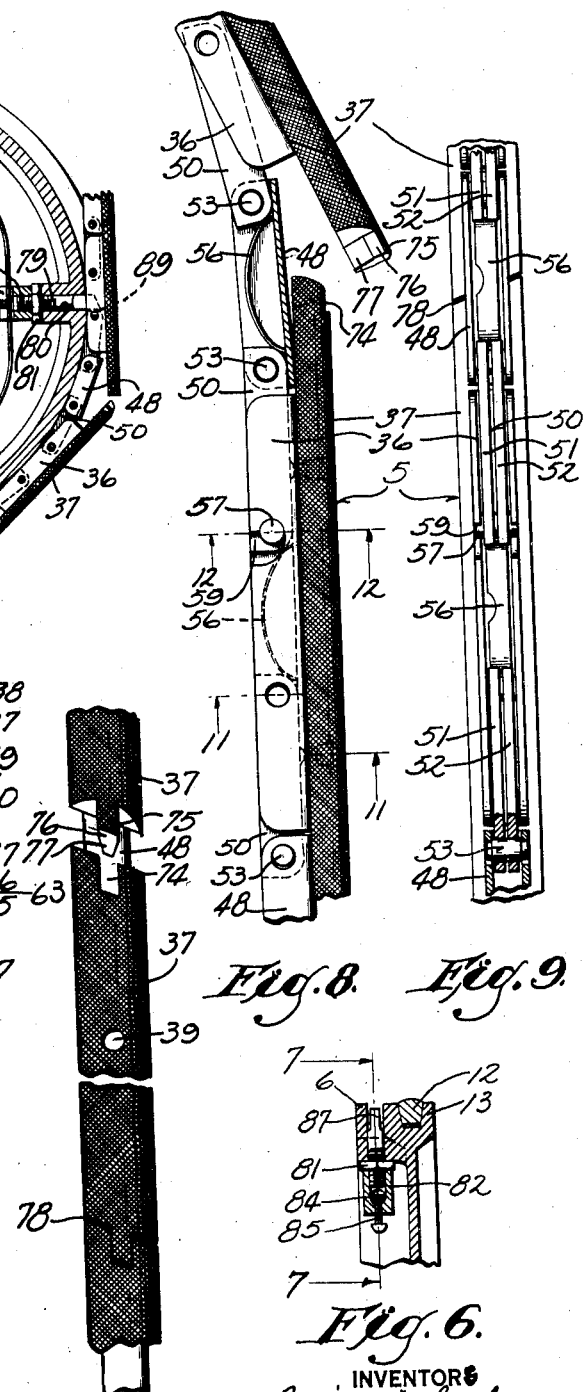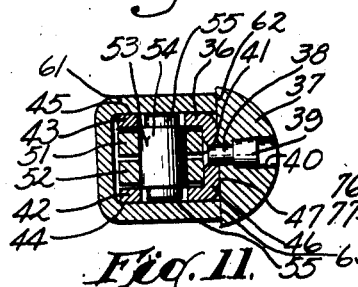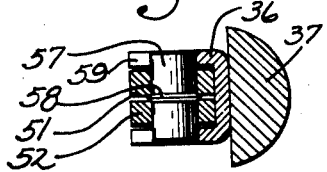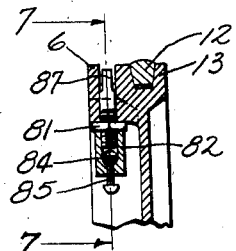

Patented June 22, 1943

2,322,684

UNITED STATES PATENT OFFICE 2,322,684

MACHINE TOOL

Benjamin Grob and Theodore Grob, West Allis, Wis.

Application August 21, 1935, Serial No. 37,159

7 Claims. (Cl. 29—76)

The present invention relates generally to improvements in machine tools and relates more specifically to the construction and mode of operation of filing machines or the like.

Generally stated, an object of the invention is to provide an improved abrasion machine, and particularly a filing machine, which is simple in construction and efficient in operation.

Another object is to provide an improved machine in which individual file or tool elements are mounted on an endless chain supported for continuous movement on suitable sheaves or pulleys, and further supported and guided to prevent displacement in a straight line portion of the path which provides a working zone.

Another object is to provide a filing machine having an improved chain and guide means therefor, adapted for effective co-operation while maintaining the guide of minimum cross section, to operate in relatively small openings in work pieces.

Another object is to provide an improved filing machine particularly adapted for adjustment and operation to shape the inside of a laterally closed aperture in a work piece, and to operate in very small apertures, and into the corners of apertures having side surfaces angularly disposed, as for instance in square apertures.

Another object is to provide an improved machine in which a guide means supports travelling file elements directly on the rear faces thereof and at laterally spaced points to prevent tipping, and at other points preventing lateral displacement of the travelling files.

Another object is to provide an improved machine having unitary guide means rigidly supported at points both above and below the working zone of a vertically travelling file chain.

Another object is to provide an improved machine having a guide for a travelling chain, together with a swivel work support or table, the guide extending through the table and supported to permit the table to swivel without disturbing the guide.

Another object is to provide an improved machine having a unitary guide device rigidly supported when in use, and supports therefor of a form co-operative to permit of convenient removal and accurate and convenient replacement, as for instance to pass the guide through a hole in a work piece, or for interchanging guides for use with tool carrying chains having different characteristics.

Another object is to provide a machine having an improved form of tool carrying chain and guide, together with other elements co-operating for convenient interchangeability of chains or guides having different characteristics.

Another object is to provide an improved machine comprising readily releasable link connections, together with a chain support normally preventing the releasable links from releasing during operation of the machine.

Another object is to provide an improved machine including a file chain having releasable link connections and means retaining the connection of the links except at desired points during removal or replacement of the chain.

Another object is to provide an improved machine providing positive drive means for a file or tool carrying chain, together with a chain having an improved co-operation for such positive drive.

Another object is to provide an improved machine in which the adjacent ends of the separate files or tool portions overlap to provide a continuous cutting surface within the working zone.

Another object is to provide file or tool elements, in which the ends of adjacent elements are interlocked to prevent relative side movement when the band is in the straight portion of its path, but in a manner permitting disengagement and re-engagement of the interlocked portions as the chain or band passes through curved portions of its path, and particularly in combination with the other improvements mentioned for the purpose of restraining the tool band or chain to a predetermined straight path working zone.

Another object is to improve on the filing machine structures of our previous Patents Numbers 1,949,742, issued March 6, 1934; 1,958,477, issued May 15, 1934; and 2,192,788 issued May 5, 1940.

Another object is to incorporate one or more of the improvements previously mentioned in a filing machine, and in a form particularly adapted for this type of machine and still another object is generally to improve the construction, arrangement, and convenience of operation of machines of the type mentioned above, and particularly of filing machines.

The invention consists in the construction and combination as parts herein shown described and claimed, and in such modifications of the structure shown and described as are equivalent to the structures of the claims.

The same reference characters have been used to designate the same parts throughout, and in the drawings:

Figure 1 is a side elevation of a machine tool incorporating the invention, the machine being a filing machine.

Figure 2 is a front elevation of the same machine.

Figure 3 is a fragmentary top view of a portion of a transmission shown in Figs. 1 and 2.

Figure 4 is a side elevation of a chain guide and its supporting elements, shown in Figs. 1 and 2.

Figure 5 is a front elevation of the structure shown in Fig. 4.

Figure 6 is an enlarged section of a portion of the rim of the lower pulley shown in Figs. 1 and 2.

Figure 7 is a section through the same pulley taken approximately along the line 7—7 of Fig. 6, and showing the chain.

Figure 8 is an enlarged side view of a portion of the file chain, shown in Figs. 1 and 2.

Figure 9 is a view of the same chain portion viewed from the rear.

Figure 10 is a front view of the chain portion shown in Fig. 8.

Figure 11 is a section through the chain taken approximately along the line 11—11 of Fig. 8 and enlarged, and showing also a portion of the guide shown in Fig. 4.

Figure 12 is an enlarged section along the line 12—12 of Fig. 8.

Referring to the drawings, the machine includes frame members 1 and 2 carried on base members 3 and 4. A file chain generally denoted by the numeral 5 is supported on guide pulleys 6 and 7, the lower pulley being rotatably supported on a shaft 8 and driven from a motor 9 through a motor pulley 9a, a belt 10, a pulley 11, a pulley 11a, a belt 12 and a pulley 13, which is fixed with the chain pulley 7. The pulleys 11 and 11a are supported on a stub shaft 14 carried by a member 15 adjustably mounted in an arm 16 which is pivoted on shaft 8. The member 15 may be adjusted along a slot 17 in the member 16 by the means of an adjusting screw 18, whereby to suitably tension the belt 12, and the weight of the pulleys 11 and 11a swings the arm 16 downwardly about its pivot to suitably tension the belt 10.

The upper pulley 7 is rotatably mounted on a shaft 19 carried on arm 20 fixed on a shaft 21, upon which is also fixed a lever 22 carrying a pivoted rod 23 which is continuously urged in a direction to move the pulley 7 upwardly by the means of a spring 24 reacting on a manually adjustable nut member 25 threadedly engaging the end of the rod 23. The structure just described normally serves to tension the file chain 5, but the tension can be relieved by adjustment of the nut 25, the spring 24 being sufficiently short that adjustment of the nut 25 permits the arm 19 and the pulley 7 to drop down.

A work table 26 is pivoted at 27 and adjustable about its pivot by the means of a screw having right and left hand threaded portions 28, 29 engaging nut portions 30 and 31 respectively pivoted with the table 26 at 32 and with the frame at 33, the nuts 30 and 31 being split, and adjustable to lock the table in adjusted position by the means of screws 34 and 35.

The file chain 5 includes a series of channel shaped links such as 36 which are rigidly connected with file elements 37, the connecting means in this instance consist of rivets such as 38 having head portion 39 standing well below the surface of the file in a bore 40, and a head portion 41 countersunk into the rear face of the flat portion of the link adjacent the file, the links 36 each providing a plurality of laterally spaced rearwardly projecting thin side portions such as 42 and 43 having side faces 44 and 45, and connected by a thin portion 46 having a flat face 47 at right angles to the side faces 44 and 45, and against which the files are rigidly retained by the rivets 38, the side portions 43 and 44 and connecting portion 46 providing a channel shaped member of relatively small cross section, as shown in Figs. 11 and 12.

Intermediate channel shaped links such as 48 are of substantially the same cross section form and size as the links 36 but relatively short. Intermediate inner links such as 50 are formed of a plurality of relatively thin members such as 51 and 52, together fitting within the inner channel of the channel links 36 and 48. With the exception of one pivot, which will be later described, all of the links 50 are pivoted with the links 36 and 48 by the means of pivot pins such as 53, Fig. 11. The pivots 53 have an enlarged intermediate portion such as 54, where they fit relatively closely in the link members 51 and 52. The ends of the pivot pins 53 are reduced as at 55. The pivot holes in the side members 43 and 44 of the channel links are sufficiently large for the enlarged pivot portions 54 to pass therethrough, but the pivot pins are normally forced by endwise chain tension sufficiently off center to retain the shoulder formed by the reduced end portions against the inner faces of the side members. This is accomplished by the means of springs such as 56 which continuously urge the inner link members 50 endwise of the chain, but the springs 56 are readily removed, and the chain may then be disassembled by aligning the enlarged intermediate portion 54 of the pivot pins with the pivot holes in the side members of the channel links, and pressing the pivots out sidewise.

The one exception to the pivot construction just described is the pivot pin 57 shown in Fig. 12, which is constructed to be unhooked to release the chain from the pulleys 6 and 7. The pivot pin 57 is formed with an enlarged central portion 58 retaining the pivot pin against endwise movement and the apertures for the pin 57 in one of the channel links 36 are of a construction which is open rearwardly as shown at 59 whereby the pin 57 can be unhooked from the channel link, but only when the chain is slack. To slacken the chain to permit unhooking the pin 57, the nut 25 is loosened to drop the pulley 7. When unhooked, the ends of the chain can be passed through a hole in a work piece resting on the table 5, the chain can then be reconnected, and adjustment of the nut 25 to provide suitable endwise tension on the chain will make the chain again operative for filing.

Each of the pulleys 6 and 7 are provided with peripheral grooves such as shown at 60, Fig. 3. These grooves are of suitable width and depth to admit the channel links 36 and 48, and to guide the chain. In addition there is provided a channel shaped guide member 61, Figs. 4 and 11 to prevent lateral movement of the file chain within the working zone, the inner surfaces of the channel side walls being closely but slidably fitted to the outside of the surfaces 44 and 45 of the channel links, and the outer faces 62 and 63 of the channel side walls providing surfaces against which the file elements 37 directly slide, the lateral spacing of these surfaces providing stability of the file elements against tipping.

The guide members 61 are rigidly fixed with a hooked member 64 which engages a rod 65 fixed in the frame to prevent downward movement and is of suitable width to be restrained against lateral movement by enlarged portions 66 and 67 on the rod. The lower end 61a of the guide member 61 is restrained against rearward movement by resting against a rod 68 fixed in the frame and is likewise restrained against side movement by enlarged rod portions such as 69 and 69a. The rods 65 and 68 provide supports fixing the position of the guide 61, and respectively above and below the working surface of the table, and the guide 61 together with the supports provides effective guarding means preventing contact of the operator with the files or chain, only the working surface of the files within the working zone being exposed.

The chain and guide construction described are of a form particularly adapted to be reduced to a very small effective cross section, whereby the chain and guide can be inserted to operate in relatively small openings in a work piece, and the guide and its supporting members are of a form particularly adapted for convenient insertion and removal, while rigidly supporting the file chain against lateral movement when the guide is in place.

Another guide means for the file chain is provided by the means of a roller 70 pivoted on an arm 71 carried by a screw 72 there being a slotted opening for the screw as at 73, the screw serving as a clamp means. By this construction roller 70 may be vertically and laterally adjusted to the best position to prevent movement of the file chain to the left of the working zone in Fig. 1, that is to say, in the direction which would permit the files 37 to move away from the guide surfaces 62 and 63 on the guide 61.

In addition to the means previously described for guiding the file chain, means are provided which additionally insure that the adjacent ends of the file elements 37 shall not be displaced sidewise relative to one another during passage through the working zone adjacent to the table 26, the construction for this purpose being as follows: Each of the adjacent file elements ends are provided with interlocking slot and tongue elements such as 74 and 75, Fig. 10. Slot elements 74 are of accurate lateral width, and the tongue elements 75, at the outer portion 76 thereof are accurately but slidably fitted in the slots. An inner portion 77 of the tongue 75 is of reduced width, adapted to guide the tongue into the slot as the file portions move out of the curved path portion to enter into the straight line portion of the path which forms the working zone.

The interlocking just described is of particular importance where the files are intended to cut an accurate form or slot. If the half round files shown in Figs. 11, 12, for instance, should be displaced laterally relative to one another even in slight degree it is obvious that the form cut by the files will not be the size or form intended.

The interlocking connection just described provides an overlap of the file sections which prevents an irregular strain being occasioned on the file chain or work piece such as might otherwise be caused by endwise separation between the file elements, and prevents thin work pieces engaging between the file ends, which might break the carrier band or files. In addition, and further to provide against irregularities in the action of the file elements, the ends of the file elements may be cut at an angle, as at 78, Fig. 10, the angle on the end of the one file element being complementary to the angle on the end of the next adjacent file element. Also the interlock prevents relative side movement of the file ends which might cause the ends to catch on the work piece when working in corners.

The lower guide pulley 6 has associated therewith means engaging links of the chain 5 for positively driving the chain. The positive driving means includes plungers such as 79 slidably guided, but prevented from rotation, in bores 80. The inner ends of the plungers are threaded and provided with stop nuts 81, locked in position by threaded members 82 which are slotted or apertured at 83 to receive a spring 84 which is held in position by screws 85, and of a form tending to press the plungers 79 outwardly to engage the chain at the trailing ends of the inner links 50 as more particularly shown at 86. The stop nuts 81 prevent the plungers 79 from moving outwardly to a point which would disturb the action of the springs 56, and the spring 84 continuously urges the plungers outwardly to the full extent permitted by the stop nuts, yet will permit the plunger 79 to move inwardly, against the resistance of the spring 84, in the event that the plunger, for any reason, does not engage the chain 5 at a point where space is provided for such engagement. The ends 87 of each of the plungers is sufficiently narrow to enter between the side members 42 and 43 of the channel links. The rearward portion of each of the plunger ends, that is to say, the side opposite the driving face, is formed at an angle, as at 88, sufficient to permit the chain to be pulled forward manually, in which case the angular surface 88 forces the plungers inwardly as the chain moves past the plungers. This construction also prevents the chain from being driven in the wrong direction, as might occur, for instance, if the motor 9 should be incorrectly connected as to direction of rotation. To provide a better driving surface for the plungers 79 the ends of the links 50 are substantially flat, as shown in Fig. 8.

The effective diameter of the pulley 6, and the spacing of the plungers 79, is so proportioned relative to the spacing of the pivots and links of the chain 5, that only one plunger at a time is normally in driving engagement with the chain, the other plungers standing slightly away from the end of the links as at 89. This is to permit of some degree of stretch or wear in the chain, while still permitting of proper action of the positive drive plungers. If no space were provided as at 89, the drive would be effective when the chain is new, but it might later occur that a plunger which was entering the chain as the pulley 6 revolves would strike in a manner preventing engagement of the plunger. In such case as the plunger which was then driving the chain passed out of chain engagement, the chain when under heavy load, might slip a distance corresponding to the spacing from the one to the next of the inner links 50 or substantially twice the distance between chain pivots. The slight space at 89 amply provides for chain wear and stretch without permitting the undesired action just described to occur, and limits the amount of chain slip which can occur to the negligible distance corresponding to the space 89.

What is claimed is:

1. In a filling machine, the combination of a frame, a plurality of vertically spaced pulleys supported from said frame, a horizontal table supported from said frame at a level between said pulleys and providing a chain opening, a chain having relatively pivoted links and supported from said pulleys for movement of a chain portion downwardly through said opening in a straight line path, file elements fixed with said chain to provide a substantially vertically continuous filing surface within said path, power means for rotation of one of said pulleys, a plurality of chain driving elements associated with the last mentioned pulley and each slidable to positions respectively engaging and disengaged from said chain, said driving elements being adapted to engage the ends of some of said links when in engaged position and the spacing of said links relative to the spacing of said elements being such as to avoid driving contact of more than one of said driving elements at a time.

2. In a filing machine the combination of a frame, a plurality of vertically spaced pulleys supported from said frame, a horizontal table supported from said frame at a level between said pulleys and providing a chain opening, a chain having relatively pivoted links and supported from said pulleys for movement of a chain portion downwardly through said opening in a straight line path, file elements fixed with said chain to provide a substantially vertically continuous filing surface within said path, power means for rotation of one of said pulleys, a plurality of chain driving elements circumferentially spaced on the last mentioned pulley and each engageable with the ends of some of said links during pulley rotation, the spacing of said driving elements at said pulley circumference being slightly greater than the spacing of said links, whereby to effect engagement of said driving elements with said links only one at a time.

3. In a filing machine the combination of a frame, a plurality of vertically spaced pulleys supported from said frame, a horizontal table supported from said frame at a level between said pulleys and providing a chain opening, a chain having relatively pivoted links and supported from said pulleys for movement of a chain portion downwardly through said opening in a straight line path, file elements fixed with said chain to provide a substantially vertically continuous filing surface within said path, power means for rotation of one of said pulleys, a plurality of chain driving elements circumferentially spaced on the last mentioned pulley and each engageable with the ends of some of said links during pulley rotation, the spacing of said driving elements at said pulley circumference being slightly greater than the spacing of said links, whereby to effect engagement of said driving elements with said links only one at a time, and means continuously yieldably urging one of said pulleys in a direction to establish longitudinal tension on said chain.

4. In a filing machine the combination of a frame, a work support carried by said frame and having a substantially horizontal work supporting surface providing a vertical opening, movable means comprising a series of connected file members, means supporting said movable means for movement of said file members one after another downwardly through said opening in a path including a straight line portion adjacent to and above said work surface, guide means restraining said file elements against lateral displacement in said path portion, a plurality of equally spaced movable driving elements, a plurality of driven elements carried by said movable means and spaced thereon in the direction of movement thereof and at a spacing less than the spacing of said driving elements, and means supporting said driving elements in driving engagement with said driven elements during movement thereof through a predetermined path.

5. In a filing machine the combination of a frame, vertically spaced upper and lower pulleys thereon, a work support on said frame between said pulleys, a flexible endless carrier trained about said pulleys and having a portion extending through said work support, a longitudinal succession of files individually attached to said carrier for travel with the latter downwardly through said work support, and mutually interlocking means at the adjacent ends of successive files operable to retain the latter against relative lateral displacement, said interlocking means having guiding surfaces extending substantially parallel to the longitudinal axes of said files.

6. An endless file train for filing machines, said train comprising a flexible endless carrier, a longitudinal succession of files individually attached to said carrier, mutually interlocking means at the adjacent ends of successive files for retaining the latter against relative later displacement, said interlocking means having guiding surfaces extending substantially parallel to the axes of said files.

7. An endless file train for filing machines, said train comprising a flexible endless carrier, a longitudinal succession of files individually attached to said carrier, mutually interlocking means at the adjacent ends of successive files for retaining the latter against relative later displacement, said interlocking means having guiding surfaces extending substantially parallel to the axes of said files and inclined relative to the faces of said files to facilitate engagement and disengagement of said interlocking means.

BENJAMIN GROB.
THEODORE GROB.